United States Patent
Huang et al.

(12) 
(10) Patent No.: US 6,436,025 B1
(45) Date of Patent: Aug. 20, 2002

(54) CO-SOLIDIFICATION OF LOW-LEVEL RADIOACTIVE WET WASTES PRODUCED FROM BWR NUCLEAR POWER PLANTS

(75) Inventors: Ching-Tsuen Huang, Tao Yuan; Jiing-Guang Tyen, Pan Chiao; Da-Luh Lu, Chung Li; Tzeng-Ming Liu, Tao Yuan; Tsye-Shing Lee, Chung Li, all of (TW)

(73) Assignee: Institute of Nuclear Energy Research (TW)

( * ) Notice: Subject to any disclaimer, the term of this patent is extended or adjusted under 35 U.S.C. 154(b) by 0 days.

(21) Appl. No.: 09/531,180

(22) Filed: Mar. 21, 2000

(51) Int. Cl.[7] .................................................. G21F 9/20
(52) U.S. Cl. ............................. 588/252; 588/4; 588/257
(58) Field of Search ............................... 588/1, 2, 3, 4, 588/6, 7, 10, 11, 13, 14, 20, 249, 251, 252, 256, 257

(56) References Cited

U.S. PATENT DOCUMENTS

| | | | |
|---|---|---|---|
| 4,793,947 A | * | 12/1988 | Izumida et al. ............. 252/628 |
| 4,804,498 A | | 2/1989 | Mizuno et al. |
| 5,732,363 A | * | 3/1998 | Suzuki et al. .................. 588/4 |

FOREIGN PATENT DOCUMENTS

| | | |
|---|---|---|
| JP | 62-126400 | 6/1987 |
| JP | 62-238499 | 10/1987 |
| JP | 62-278499 | 12/1987 |
| JP | 4-128699 | 4/1992 |

* cited by examiner

Primary Examiner—Wayne A. Langel
Assistant Examiner—Eileen E. Nave
(74) Attorney, Agent, or Firm—Burns, Doane, Swecker & Mathis, L.L.P.

(57) ABSTRACT

This invention discloses a method for the co-solidification of low-level radioactive wet wastes of BWR nuclear power plants, including concentrate waste, spent ion exchange resins and sludge wastes etc., with very high volume efficiency. In this invention, for promoting the stability of the solidified waste, sodium sulfate in the concentrate solution is converted to sodium hydroxide and barium sulfate by reacting with barium hydroxide. The conversion product barium sulfate possessing high density and stability is insoluble and used as a fine aggregate material in the solidified waste. Sodium hydroxide is used to stabilize ion exchange resins and to form a highly water-durable solidified waste form with silicates and phosphates in the solidification agent mixture. The solidification agent used in this invention is a formulated powder mixture completely made from inorganic materials. Therefore, there is no aging problem of the solidified waste. In this invention, the waste loading of the solidified waste is highly increased due to the conversion of sodium sulfate and the co-solidification of wastes. Thus, the solidification volume efficiency of the present invention is about three times of the solidification of the waste separately.

6 Claims, No Drawings

CO-SOLIDIFICATION OF LOW-LEVEL RADIOACTIVE WET WASTES PRODUCED FROM BWR NUCLEAR POWER PLANTS

FIELD OF THE INVENTION

This invention generally relates to radioactive waste disposal technology. In particular, this invention relates to radioactive wet wastes solidification. More particularly still, this invention relates to co-solidification of low-level radioactive wet wastes which are produced from BWR nuclear power plants.

BACKGROUND OF THE INVENTION

In operation, the boiling water reactor (BWR) used in a BWR nuclear power plant produces wet wastes such as liquid sodium sulfate concentrate waste, powdery spent ion-exchange resin and sludge wastes. These wet wastes are radioactive and therefore must need be subject to solidification treatment and made into chemically as well as physically stable solid matters before their final disposal as the common safety measures for radioactive wastes require.

At present, there are three kinds of solidification treatments for low-level radioactive wet wastes: they are cement solidification, polymer solidification and bitumen solidification. Among these solidification methods, cement solidification presents the worst volume efficiency; accordingly, even though its operation is the simplest of the three and its product, the cement-solidified waste, has the required long-term stability, it is scarcely considered as an attractive method because of the high cost that reflects in the final disposal procedures.

Polymer solidification and bitumen solidification employ organic materials for their solidification agents, and both are of high volume efficiency. However, with regard to bitumen solidification, bitumen-solidified waste is flammable besides its low compressive strength. Once in Germany such solidified waste burst into flames during a bitumen solidification process; and, some years ago, one of the Japanese bitumen solidification systems exploded and brought about a serious radioactive accident to the worry of the whole world. Many countries in Europe have since prohibited the operation of bitumen solidification; and, in the rest of the world, bitumen solidification systems and plants are being closed down one by one.

As to the use of polymer solidification, this is a highly controversial issue; while, in spite of that, new polymer solidification systems still keep coming out. Those who are against it argue that, the stability of polymer-solidified waste may be dangerously unreliable because of polymer aging. Although many countries no longer approve polymer solidification in the treatment of radioactive wet wastes, this method is still widely used in some other countries for the advantage of its high volume efficiency.

Under the circumstances, the principal research direction for low-level radioactive wet wastes solidification is to increase the volume efficiency of inorganic solidification agents, in the hope that by which the organic method may be replaced as soon as possible.

The traditional cement solidification is just such an inorganic method. One problem this method often meets with is that, in the process of solidification of sulfate liquid waste, sulfate reacts with tricalcium aluminate, $3CaO.Al_2O_3$, forming gradually a low-density solid matter called ettringite, which as a rule causes distortion and sometimes even cracks in the solidified waste owing to volume expansion. To this problem two obvious preventive measures are (1) to decrease the sulfate to cement ratio and (2) to reduce tricalcium aluminate content in cement. The former is not at all interesting, since it results in much larger solidified waste and consequently much greater cost in the final disposal procedures. While the latter is far from satisfactory, not only because the cement with low tricalcium aluminate content is not easily available, but mainly because the formation of ettringite is so slow a process that long-term stability of such solidified waste is extremely doubtful.

In U.S. Pat. No. 04,804,498 a strategy is proposed to get rid of the aforesaid problem caused by sodium sulfate which is highly reactive and easily soluble. It is to have sodium sulfate reacted with barium hydroxide to become barium sulfate and sodium hydroxide, and then separate the two, and have barium sulfate solidified and sodium hydroxide recycled for reuse. Thanks to the high stability and the extremely low solubility of barium sulfate, the solidified waste so produced is very stable, free from the troubles often encountered in the solidification of sodium sulfate liquid waste. Nevertheless, with one problem solved a new one is created immediately. For the reason that the separated sodium hydroxide takes with it most of the radioactive elements, further decontamination procedures are needed before it is able to be recycled for reuse; and usually the recycled chemical soon loses its potency after a few runs of recycling because of the speedy build-up of its content of contaminants; therefore, in the end, solidification treatment still has to be resorted to.

A Japan Laid-Open Patent Publication (No. 62, 126, 400) reports a solidification method relevant to the present disclosure, in which sodium sulfate liquid waste is dried into powder, then it is mixed with barium hydroxide, resulting in water, sodium hydroxide and the insoluble barium sulfate; and then silicon dioxide and solidification agent are introduced to facilitate solidification. High energy cost in the use of vaporization dryer is a major drawback of this method, besides a few engineering problems such as solid-solid reaction, agitation, and heat transfer need to be overcome.

Still another Japan Laid-Open Patent Publication (No. 04, 128, 699) discloses a solidification method, in which barium sulfate and sodium hydroxide liquid mixture is produced like the foregoing U.S. patent, only this time without their separation; and subsequently the mixture is concentrated via evaporation, and then silicon dioxide and cement are introduced to solidify the wet wastes. It is known that the quality of cement solidified waste in a great measure depends upon the amount of sodium hydroxide present in the waste. With the reaction of sodium hydroxide and silicon dioxide, sodium silicate are produced; and sodium silicate can react with the calcium ions coming out of the hydration of cement, forming a silicon-calcium gelatinous hydrated product. Obviously, therefore, the quality of solidified waste has a good deal to do with the amount of silicon dioxide and the kind and quantity of cement employed. Specifically addressing to this problem, it is proposed in Japan Laid-Open Patent Publication No. 62, 278, 499 that, if radioactive wet waste is to be solidified with the help of sodium silicate, the silicon to sodium ratio should be kept within the range from 0.5 to 1.0. Because it is found that, when the sodium hydroxide content exceeds 8 wt. %, the compressive strength of the solidified waste becomes lower than $50 \text{ kg/cm}^2$. This clearly shows that, even after sodium sulfate liquid waste has been converted to barium sulfate and sodium hydroxide, the quality of cement-solidified waste still much depends on the kinds and quantities of solidification agents in use, and, of course, also on solidification conditions.

As to the solidification of powdery spent ion-exchange resin, in most of the BWR nuclear power plants this kind of waste is solidified with cement. Usually within such solidified waste there is 20% of spent ion-exchange resin by weight. Be that as it may, it is possible that the ion-exchange resin content may reach as high as 30% of the total weight of the solidified waste, and such solidified waste still possesses strong enough compressive strength, as demonstrated in Japan Laid-Open Patent Publication No. 62, 238, 499, where spent ion-exchange resin, having been treated with sodium hydroxide, is solidified by the addition of blast furnace slag powder.

Although some of the above-mentioned solidification treatments can produce solidified wastes of sufficient compressive strength, it may be proper to emphasize over here that, every one of those previous arts only deals with one kind of radioactive wet waste with very limited volume efficiency.

SUMMARY OF THE INVENTION

Accordingly, the solidification method of the present invention herein disclosed adopts the strategy of making waste solidified with waste, which can direct concentrated sodium sulfate liquid waste and spent ion-exchange resin to be solidified together. The procedures and principles of this solidification method are the following. First, have sodium sulfate liquid waste react with barium hydroxide, so that the liquid waste is converted into a slurry of barium sulfate and sodium hydroxide. Second, add into the slurry spent ionexchange resin which at once reacts with sodium hydroxide, the reaction being able to increase the stability of the waste by reducing the ion-exchange activity of the resin. Third, have the slurry thoroughly mixed with a solidification agent which is composed of cement, fine silica gel particles, pozzolanic materials (such as blast furnace slag powder and fly ash), silicate, phosphate, etc.

This novel method for radioactive wet wastes solidification at once co-solidifies both sodium sulfate liquid waste and spent ion-exchange resin, and demonstrates the following advantages: (1) By having the chemically very unstable sodium sulfate converted into barium sulfate which has very high stability, this not only warrants the stability of the solidified waste but also gains result in waste volume reduction thanks to the high density (4.5) of barium sulfate. (2) During the process of solidification barium sulfate serves as a fine aggregate material which enhances the strength of solidified waste. (3) By having spent ionexchange resin reacted with sodium hydroxide, the ion-exchange activity of the resin is greatly reduced, so that the problem of solidified waste volume expansion is no longer present. (4) All the converted wastes are solidified together, without producing secondary wastes, and without the complication of waste recycle. (5) With suitable preparation of solidification agent, sodium hydroxide can form with the solidification agent into an insoluble solidified matter which encases and solidifies the other wastes. This technique not only reduces the use of solidification agent but also achieves the goal of making waste solidified with waste.

DETAILED DESCRIPTION OF THE INVENTION

In the following, the inventor will use some laboratory examples to illustrate in detail the co-solidification method as well as the preparation of solidification agents. These embodiments of the invention, including their procedures, conditions and results, only partly indicate the application range of the invention: they do not represent the full scope of the same and can not be regarded as limits to the same.

EXAMPLE I

Take 920 parts (by weight, same for all the parts to be mentioned) of 98 wt. % sodium hydroxide solution and 2760 parts of barium sulfate, and mix them in an agitator, at the same time slowly add in 2300 parts of deionized water. Agitation continues until sodium hydroxide is wholly dissolved, then wait till the solution cools down to 30° C., and keep it at that temperature. Before adding in solidification agent, weigh the solution and add in suitable amount of 30° C. deionized water to compensate for water loss due to vaporization during the agitation process.

Prepare homogeneous powdery solidification agent by mixing and grinding together type-2A cement (a product of Taiwan Cement Cooperation), pozzolanic materials (including blast furnace slag powder and fly ash), and silicon, phosphate, calcium phosphate and magnesium phosphate powders. The major components of this solidification agent are 27.14% $SiO_2$, 6.86% $Al_2O_3$, 46.29% CaO, 1.71% $Fe_2O_3$, 2.14% MgO, 7.71% $P_2O_5$, and 5.57% $SO_3$, by chemical analysis. Then, gradually add this homogeneous powdery solidification agent into the sodium hydroxide and barium sulfate mixture solution, to which vigorous agitation is applied at the same time, till the resultant slurry becomes visibly homogeneous. Weight ratio of solidification agent to the slurry is 0.54. In this experiment, as soon as the last particle of solidification agent is added into the agitator, agitation continues for 10 more minutes, and then immediately pour the slurry into a number of cylindrical polyethylene moulds, each of these moulds being of inner diameter 5 cm and height 11 cm, which are then sealed and laid still in room temperature over a period of 30 days for setting and hardening. And then take out the solidified wastes from the moulds, from which select five and saw off their rough ends to make five standardized cylindrical specimens, 10 cm in length. Compressive strength tests are performed with these five specimens following the test procedures of ASTM C39, according to the requirement of U.S. Nuclear Regulatory Commission (USNRC). The average compressive strength of these five specimens is found to be 50 kg/cm². Additionally, following the standard test procedures specified by Taiwan Atomic Energy Council for low-level radioactive wastes quality control, it is found that the average compressive strength after water immersion (i.e. the compressive strength of a specimen after its being soaked in water for 90 days) of these specimens is 81 kg/cm²; and their average compressive strength after thawing-and-freezing (i.e. the compressive strength of a specimen after its being placed within weather test chamber run with 30 cycles of temperature from −10° C. to +60° C., and of relative humidity from 60% to 95%) is 48 kg/cm².

EXAMPLE II

Dissolve 373 parts of 98 wt. % sodium hydroxide solution in 2038 parts of water, then add in 1167 parts of powdery ion-exchange resin (POWDEX, the trade name); vigorously mix them for 30 minutes to form a homogeneous slurry. Prepare powdery solidification agent according to the method given in Embodiment I. The major compositions of this solidification agent are 23.2% $SiO_2$, 4.59% $Al_2O_3$, 61.19% CaO, 3.79% $Fe_2O_3$, 2.88% MgO, 2.2% $P_2O_5$, and 1.58% $SO_3$, by chemical analysis. Apply the same solidification method as before; only this time the weight ratio of solidification agent to the slurry is 0.887. Solidified waste specimens are prepared also in the same way as already discussed in the previous example, from which five are selected for testing. The average compressive strength of these specimens is 59 kg/cm$^2$, their average compressive strength after water-immersion test is 113 kg/cm$^2$, and after thawing-and-freezing test is 72 kg/cm$^2$.

EXAMPLE III

Dissolve 482 parts of sodium hydroxide in 1800 parts of water, then add in 1418 parts of barium sulfate and 1354 parts of powdery ion exchange resin (POWDEX); vigorously mix them into a homogeneous slurry. Prepare powdery solidification agent according to the method given in Example I. The major compositions of this solidification agent are 36.05% $SiO_2$, 5.72% $Al_2O_3$, 38.61% CaO, 1.43% $Fe_2O_3$, 1.79% MgO, 9.61% $P_2O_5$, and 4.65% $SO_3$. Apply the same solidification method as before; only this time the weight ratio of solidification agent to the slurry is 0.425. Solidified waste specimens are prepared also in the same way as before, from which five are selected for testing. The average compressive strength of these specimens is 58 kg/cm$^2$, their average compressive strength after water-immersion test is 111 kg/cm$^2$, and after thawing-and-freezing test is 64 kg/cm$^2$.

EXAMPLE IV

Dissolve 580 parts of sodium hydroxide in 2346 parts of water, then add in 1285 parts of barium sulfate and 1449 parts of powdex; vigorously mix them into a homogeneous slurry. Prepare powdery solidification agent by the same method as shown in Example I. The major compositions of this solidification agent are 30.72% $SiO_2$, 3.08% $Al_2O_3$, 41.02% CaO, 2.54% $Fe_2O_3$, 1.93% MgO, 19.28% $P_2O_5$ and 1.06% $SO_3$. Apply the same solidification method as before; only this time the weight ratio of solidification agent to the slurry is 0.389. Solidified waste specimens are prepared also in the same way as before, from which five are selected for testing. The average compressive strength of these specimens is 39 kg/cm$^2$, their average compressive strength after water-immersion test is 53 kg/cm$^2$, and after thawing-and-freezing test is 56 kg/cm$^2$.

EXAMPLE V

Collect 2765 parts of 20 wt. % sodium sulfate liquid waste from Taiwan Nuclear Power Plant II, which is then gradually mixed in with 1226 parts of barium hydroxide powder, $Ba(OH)_2 \cdot 8H_2O$, to produce a barium sulfate and sodium hydroxide mixture solution. The solution is slowly heated up to get rid of 1745 parts of water through vaporization, and then, 864 parts of spent powdery ion-exchange resin (POWDEX) also obtained from the nuclear power plant is mixed in to form a homogeneous slurry. Wait till the temperature of the slurry cools down to 30° C., then add in powdery solidification agent which is the same as that of Example III. In this experiment weight ration of solidification agent to the slurry is 0.389. Specimen preparation and compressive-strength test procedures are again same as before. The average compressive strength of these specimens is 43 kg/cm$^2$, their average water-durable compressive strength after water-immersion test is 46 kg/cm$^2$, and after thawing-and-freezing test is 46 kg/cm$^2$. Moreover, by the test method of ANSI 16.1 the average filtration indexes of Co-60, Cs-134 and Cs-137 are found to be 8.34, 6.27 and 6.32 respectively.

While the invention has been particularly shown and described with reference to the foregoing embodiments, it will be understood by those who are skilled in the art that other changes can be made therein without departing from the spirit and scope of the invention in its broader aspects.

What is claimed is:

1. A method for co-solidifying sulfate solution and spent ionexchange resins, comprising the steps of:
   converting the sodium sulfate solution into a slurry of sodium hydroxide and barium sulfate;
   removing water from the slurry by evaporation;
   mixing the slurry with the ion-exchange resins to form mixed wastes; and
   homogeneously mixing a powdery solidification agent prepared from cement, pozzolanic materials and at least one species of oxides or salts of divalent metals into the mixed wastes to form a mixture of mixed wastes and solidification agent and leaving the mixture of mixed wastes and solidification agent for setting and hardening. wherein after the removal of water, water content of the slurry is less than 50%.

2. The method as claimed in claim 1, wherein the solidification agent includes oxides or salts selected from the group consisting of borates, silicates, carbonates, and phosphates.

3. The method as claimed in claim 1, wherein the solidification agent includes oxides or salts selected from the group consisting of oxides and salts of calcium, silicon, magnesium, aluminum, iron, and zirconium.

4. The method as claimed in claim 1, wherein the pozzolanic materials in the solidification agent are selected from the group consisting of silica fume, blast furnace slag powders and fly ash.

5. The method as claimed in claim 4, wherein a weight ratio of the solidification agent to the mixed wastes is less than 1.

6. The method as claimed in claim 4, wherein the mixed wastes and the solidification agent are mixed at a temperature below 90° C.

* * * * *